May 11, 1943.  P. CARLSON  2,318,751

VEHICLE SEAT

Filed Nov. 10, 1939

INVENTOR
PHILIP CARLSON
BY
ATTORNEY

Patented May 11, 1943

2,318,751

UNITED STATES PATENT OFFICE 2,318,751

VEHICLE SEAT

Philip Carlson, Long Hill, Conn.

Application November 10, 1939, Serial No. 303,770

1 Claim. (Cl. 296—65)

This invention relates to new and useful improvements in vehicle seats and has particular relation to an improved driver's seat especially adapted for use in package delivery trucks.

An object of the invention is to provide in a delivery truck including a pair of opposite side doors, a low step at the inner side of each such door, and a flat platform like floor space in a plane above and located between such steps, whereby a driver entering each door may readily mount to said platform like floor portion to gain access to the truck body in the rear of said portion, a driver's seat shiftable between a position for use wherein it partly blocks one of said doorways and prevents the use thereof in the manner described and a position substantially entirely forwardly of said doorway and more or less under the steering wheel and column and over the control pedals of the vehicle.

Another object is to provide in a package delivery vehicle a driver's seat including a supporting column, a seat on said column, a back foldable over said seat, means of pivoting said column for swinging movement whereby the seat may be moved from a position ready for use to a folded or inoperative position, and bracket means associated with said column and positively limiting swinging movement thereof.

Other objects and advantages will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

Figure 1:
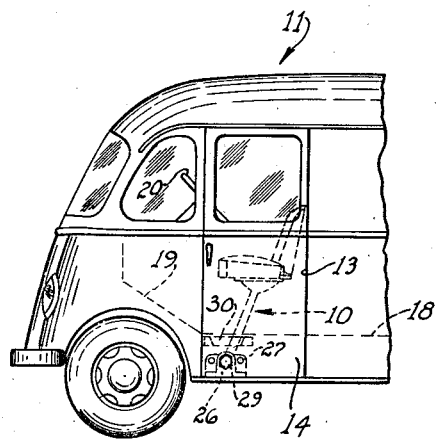
Fig. 1 is the side elevation view showing the forward portion of a truck equipped with a driver's seat made in accordance with the invention, the seat being shown in dotted lines.

Referring in detail to the drawing my improved seat, generally designated 10, is mounted in a truck body generally designated 11 a portion of which is shown. Body 11 is of the general type disclosed in my Patents 2,116,666 of May 10, 1938, and 2,165,452 of July 11, 1939, and includes opposite sidedoor openings 12 and 13 adapted to be closed by sliding doors 14. Immediately inwardly of said doors are comparatively low steps 15 and 16 between which is a platform like floor portion 17 located in a plane above that of the steps and in fact comprising an extension of the floor 18 of the truck body.

Obviously with this arrangement the driver or other attendant may readily enter the truck body from either side thereof and move along the platform 17 to the load carrying floor portion 18. Forwardly of the step 16 and a portion of the platform 17 is an inclined footboard 19 mounting the usual foot pedals as the brake, clutch and accelerator. Preferably the gear shift lever (not shown) is located as usual on the steering wheel or column 20.

My improved seat 10 includes a supporting column 21 on the upper end of which is a seat cushion 22 and the back rest 23 which parts are mounted on the column in a manner to be described. Between the step 16 and the platform 17 is a vertical wall 24 and closing the front end of the step is a vertical wall 25. A U-shaped bracket 26 is secured to the wall 24 and the forward inner corner portion of the step 16 as by bolts 27 and 28 respectively. Mounted by the arms of such bracket is a bolt 29 on which the lower end of the column 21 is pivotally supported. The inner end of the bolt is threaded into the inner bracket arm.

A second bracket 30 is secured to the upper forward portion of the wall 24 and to the upper portion of the wall 25 by screws or bolts 31 and 32 respectively. Bracket 30 is provided with a slot 33 through which the seat supporting column 21 passes. Obviously the ends of the slot 33 will positively limit swinging movement of column 21 on stud 29.

On the upper end of column 21 is a hollow bowl shaped casting or head 34 having a lateral flange 35 at each of its sides and which flange is received at opposite sides of the bowl in guideways provided by elongated strips 36 secured on the under side of a base or plate 37 supporting the seat cushion 22. Spacers 38 cooperate with the strips 36 in providing the guideways for the flanges 35 and thus provide space for a perforated keeper plate 39 secured to the underside of the base 37.

Figure 4:
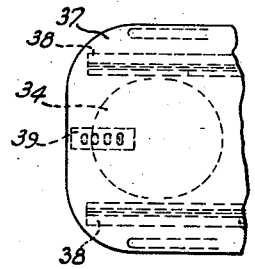
Fig. 4 is a top plan view of a portion of the seat.
Figures 5, 6, 7:
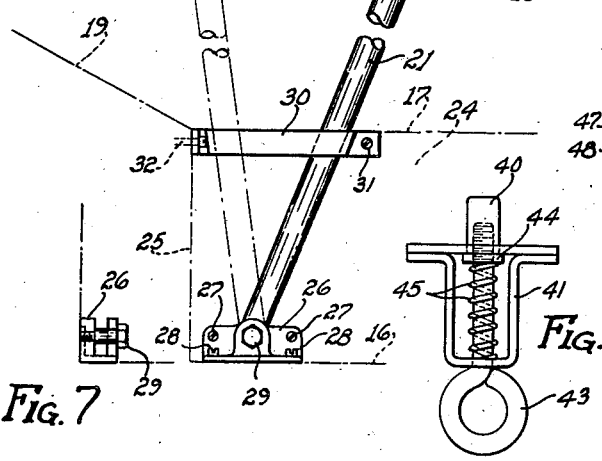
Fig. 5 is a rear elevational view showing the adjustable mounting of the seat proper on the supporting column.
Fig. 6 is an enlarged elevational view of a locking bolt for securing the seat in adjusted relation to the column.
Fig. 7 is a detail, in elevation, of the supporting bracket.

A lock bolt 40 is adapted to engage any of the openings in keeper 39 four openings being shown in such keeper in Fig. 4. Obviously the number of openings is immaterial. A housing 41 carries the bolt 40 and is secured to the head 34, as in Fig. 2, and the bolt passes through the head. Secured to the bolt and projecting through the lower end of the housing 41 is a threaded member 42 the lower end of which is bent upon itself to provide an enlarged finger piece 43.

Within the housing about member 42 and bearing against the housing and against a head-like portion 44 of the bolt is a coil spring 45. This spring constantly tends to keep the bolt in projected position and it will be clear that on the bolt being withdrawn by a pull on the finger piece 43 the bolt is disengaged from the keeper 39. Thereafter the seat may be shifted backwardly or forwardly on the head 34 whereby to dispose the driver closer to or further from the steering wheel 20. Thereafter the bolt is released and the spring projects it to engage in the selected opening in the keeper 39 whereby to secure the seat in the desired adjusted relation to the column or upright 21.

Back rest 23 includes arm portions or side portions 46 pivoted at 47 to uprights 48 supported from the seat base 37. With this arrangement it will be apparent that said back rest may readily be swung from the extended useful position shown by the full lines in Fig. 3 to the folded or dotted line position in said figure wherein the said back rest is disposed on or very slightly above the cushion 22.

Figure 3:
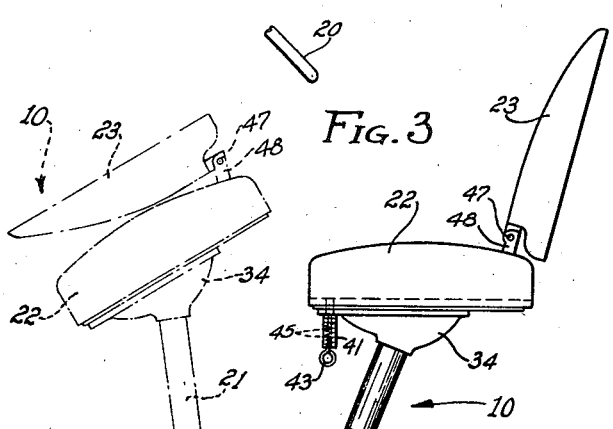
Fig. 3 is an enlarged side elevational view of the seat showing in dotted lines the folded position thereof.

With the construction disclosed when the driver is occupying the vehicle the seat is located as in Fig. 1 or as in the full line position of Fig. 3. The seat cushion and the back rest are adjustable together forwardly or rearwardly with respect to the column 21 by manipulation of the seat on withdrawal of the bolt 40 as above described. After the desired adjustment is made bolt 40 is again engaged in one of the openings in the keeper 39.

Figure 2:
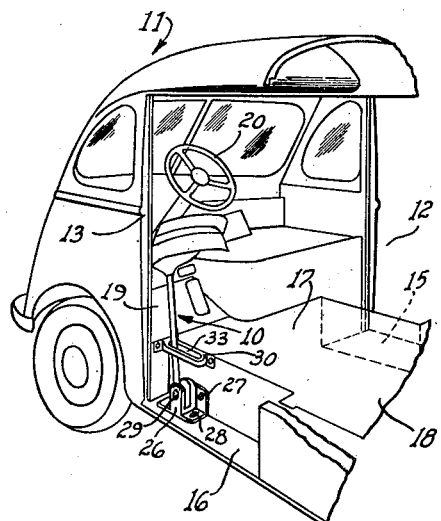
Fig. 2 is the perspective view showing the interior of the front truck body portion and showing the driver's seat in its folded out-of-the-way position.

When the driver wishes to enter the body of the vehicle from the left side thereof (that is by using the step 16) he pushes the back rest 23 to the dotted line position of Fig. 3 (that is on to the seat cushion 22) and then by giving the seat a forward push swings the whole seat to the dotted line position of Fig. 3 which is the same as the position of the seat in Fig. 2. That is the seat is swung to an out-of-the-way position under the steering wheel 20 and over and spaced above the foot board 19. The ends of the slot 33 of the bracket 30 limit such swinging movement of the seat.

From an inspection of the drawing it will be apparent that when the seat is in the described out-of-the-way or folded position a person may readily enter upon the platform 17 from either sidedoor opening 12 and 13. When the seat is in the described forward position both door openings are clear of obstruction and a person may readily pass through the vehicle from one side to the other over the platform 17. It will be clear from an inspection of the drawing that when the back rest 23 is in folded position it will clear the steering wheel 20 as the seat is moved or swung to the described out-of-the-way position.

Having thus set forth the nature of my invention, what I claim is:

In a package delivery truck, a truck body having a side door opening, a low step immediately inwardly of said opening, a platform immediately inwardly of said step and in a plane above the same, a footboard extending forwardly from the forward edge of said platform and step in a plane above the step, a vertical wall between the forward edge of the step and the rear edge of said footboard, a vertical wall at right angles to said vertical wall and between the inner edge of said step and the edge of the platform toward said door opening, a U-shaped bracket, means securing the connecting portion of said bracket against said step toward the forward end thereof and immediately adjacent the second mentioned wall, means securing an arm of said bracket to the second mentioned wall, a horizontal pivot supported by the arms of said bracket, a driver's seat including an upright having its lower end mounted on said pivot for swinging movements between a rearwardly inclining position of use substantially blocking said door opening and a forwardly inclining out of the way position over said footboard, a second bracket abutting at its forward end against the first mentioned wall and extending along a portion of the upper edge of the second mentioned wall, means securing said second bracket to each of said walls, said second bracket having a closed ended forwardly and rearwardly extending slot therethrough, and said upright passing through said slot and partially supported in its position of use by the bracket portion defining the rear end of said slot.

PHILIP CARLSON.